United States Patent [19]

Reischl

[11] 4,251,638

[45] Feb. 17, 1981

[54] PROCESS FOR THE PRODUCTION OF POLYURETHANE PLASTICS

[75] Inventor: Artur Reischl, Leverkusen, Fed. Rep. of Germany

[73] Assignee: Bayer Aktiengesellschaft, Leverkusen, Fed. Rep. of Germany

[21] Appl. No.: 89,322

[22] Filed: Oct. 29, 1979

[30] Foreign Application Priority Data

Oct. 27, 1978 [DE] Fed. Rep. of Germany ........ 2846809

[51] Int. Cl.³ .............................................. C08G 18/14
[52] U.S. Cl. ..................................... 521/128; 521/137; 521/160; 521/163
[58] Field of Search ................ 521/128, 137, 160, 163

[56] References Cited

U.S. PATENT DOCUMENTS

| | | | |
|---|---|---|---|
| 3,455,836 | 7/1960 | Shultz et al. ...................... | 252/182 R |
| 3,634,361 | 1/1972 | Shultz et al. ...................... | 252/182 R |
| 3,897,314 | 7/1975 | Liebsch et al. ................ | 260/453 SP |
| 3,935,132 | 1/1976 | Gerkin et al. ........................ | 521/137 |
| 4,000,099 | 12/1976 | Nemoto et al. ................. | 260/18 TN |
| 4,049,590 | 9/1977 | Falkenstein et al. ................. | 521/137 |
| 4,071,505 | 1/1978 | Meckel et al. ......................... | 528/49 |
| 4,096,101 | 6/1978 | Blahak et al. ........................ | 521/137 |
| 4,143,008 | 3/1979 | Zwolinski et al. ............. | 260/18 TN |

FOREIGN PATENT DOCUMENTS 2333150 1/1974 Fed. Rep. of Germany .
1346402 2/1974 United Kingdom .

*Primary Examiner*—Maurice J. Welsh
*Attorney, Agent, or Firm*—Gene Harsh; Joseph C. Gil

[57] ABSTRACT

This invention relates to a process for the production of optionally cellular polyurethane plastics using a reactive filler obtained by finely grinding a distillation residue of the type accumulating in the commercial production of tolylene diisocyanate. It is possible in this way to recycle the previously unuseable slag-like residues and at the same time to improve the mechanical properties of the polyurethane plastics filled with them.

9 Claims, No Drawings

PROCESS FOR THE PRODUCTION OF POLYURETHANE PLASTICS

BACKGROUND OF THE INVENTION

Considerable quantities of relatively high molecular weight, crosslinked, secondary products are formed in the production of isocyanates on an industrial scale. These secondary products are obtained as tar-like, non-distillable residues during the working up by distillation, of the crude isocyanate solutions obtained in the phosgenation of amines. These residues cannot be used as such for the conventional applications of polyisocyanates (production of polyurethane plastics). In order to avoid a total loss of the non-distillable residue, it is possible in some cases (for example in the phosgenation of diamines of the diphenyl methane series) to isolate only part of the pure monomeric isocyanate from the crude phosgenation product, i.e. to leave a considerable proportion of monomeric isocyanate in the sump phase, in order to obtain the relatively high molecular weight secondary products in solution. For the liquid polyisocyanate mixture enriched with relatively high molecular weight products obtained in this way (so-called "crude MDI"), it has been possible in recent years to find a number of potential applications in special polyurethane plastics.

All attempts, however, to use tolylene diisocyanate enriched with relatively high molecular weight secondary products ("crude TDI") and having a low, but still economically acceptable content of monomeric tolylene diisocyanate have so far failed. During distillation of the phosgenation product of tolylene diamines, relatively high molecular weight insoluble products containing uretdione, isocyanurate, carbodiimide, uretone imine, urea and biuret groups are formed under the conditions used in practice. Depending on the o-tolylene diamine content of the starting product, methyl benzimidazolones can also be formed during phosgenation and, with time, are biuretized with the free isocyanate groups present, accompanied by formation of insoluble, cross-linked products. Although crude TDI distillation residues which still have a high monomer content (greater than 80% by weight) and contain virtually no methyl benzimidazolone or its derivatives, are soluble or liquid, they are insufficiently stable in storage. The content of free NCO-groups decreases during storage, even at room temperature, accompanied by an increase in viscosity.

Numerous processes have also been proposed (U.S. Pat. No. 3,634,361; German Offenlegungsschrift No. 2,123,183; German Offenlegungsschrift No. 2,333,150; U.S. Pat. No. 3,455,836 and German Offenlegungsschrift No. 2,423,594) for dissolving TDI distillation residues which still have a considerable content of free NCO-groups (preferably greater than 20% by weight), in an organic solvent in the presence of monomeric diisocyanates, optionally at a high temperature, and for using these residue solutions as the isocyanate component in the polyisocyanate polyaddition process. In practice, however, this method of utilizing the TDI residues fails because of the inadequate stability during storage and the inability to standardize the solutions (if in fact dissolutions were possible at all) or because of the sedimentation of insoluble constituents.

In recent years, TDI distillation residues have been partly utilized by means of alkaline hydrolysis. Unfortunately, only relatively small proportions of tolylene diamines can be recovered.

More success in maximizing the TDI yield has been achieved by the so-called long-tube vertical evaporators (U.S. Pat. No. 3,897,314), which has been adopted for use on a wide scale in the commercial production of tolylene diisocyanate, and mixtures of 2,4- and 2,6- tolylene diisocyanate and by continuous thermolysis of the liquid TDI residue tar. In the above process, the residue is substantially free from monomers, but still contains free isocyanate groups. This residue has to be stirred into water (quenching) in the form of a hot (approximately 150° to 300° C.) tar-like mass immediately after separation of the pure monomeric TDI in order to avoid smoldering fires and for physiological reasons. During this quenching process, the majority of the free isocyanate groups still present react with the water to form additional polyurea groups (hereinafter called denaturing), this reaction being accompanied by the evolution of carbon dioxide. Thus, only a very small percentage, generally around 1 to 10 by weight, of included isocyanate groups are left unreacted. Storage in water or in moist form causes the isocyanante content to undergo a further gradual reduction over a prolonged period.

The slag-like TDI residues containing urea groups are substantially insoluble in all the conventional solvents. At temperatures above about 250°±30° C. they begin to melt to some extent, decomposing and giving off gases.

No commercially or economically interesting possibilities for utilizing these TDI-residue slags have yet been found.

The vast majority of TDI distillation residues accumulating in the production of TDI is either dumped or burned in furnaces with considerable difficulty. In cases where TDI residue slags are burned, deposits of firmly adhering, substantially incombustible tarry masses accumulate on the bottom of the combustion chamber and, in many cases, decompose explosively at temperatures above about 500° C.

The object of the present invention is to provide commercially feasible possibilities for recycling TDI distillation residue slags, particularly the TDI residues slags denatured with water.

DESCRIPTION OF THE INVENTION

It has now, surprisingly, been found that TDI distillation residues can be converted into high-quality reactive fillers by very fine grinding. Optionally the grinding process can be accompanied and/or followed by simple chemical modification reactions in the heterodisperse phase. These fillers may be used in the production of polyurethane plastics for improving their mechanical properties.

The present invention relates to a process for the production of optionally cellular polyurethane plastics by the polyaddition of (A) polyisocyanates and, optionally, (B) low molecular weight and/or relatively high molecular weight compounds containing isocyanate-reactive hydrogen atoms in the presence of (C) organic fillers and, optionally, (D) blowing agents, catalysts and other additives known per se, wherein component (C) is a substantially monomer-free, crosslinked, distillation residue which is insoluble in inert organic solvents and which cannot be melted without decomposing, of the type accumulating as slag in the removal of monomeric tolylene diisocyanates by distillation, which has been size-reduced to a mean particle size of less than 800 mµ, preferably less than 350 mµ, most preferably less than 50 mµ and, with particular preference, less than 10 mµ. The instant invention can also use TDI residues which have been water quenched and denatured. This invention can also be used with TDI residues which have been chemically modified by reaction with carbonyl compounds and/or compounds reactive to isocyanate groups and/or carbodiimide groups.

The following materials are used for carrying out the process according to the present invention:

1. As starting components, aliphatic, cycloaliphatic, araliphatic, aromatic and heterocyclic polyisocyanates of the type described, for example, by W. Siefken in Justus Liebigs Annalen der Chemie, 562, pages 75 to 136, for example those corresponding to the following general formula:

Q(NCO)$_n$ wherein n represents 2 to 4, preferably 2, and,

Q represents an aliphatic hydrocarbon radical containing from 2 to 18 carbon atoms, preferably from 6 to 10 carbon atoms, a cycloaliphatic hydrocarbon radical containing from 4 to 15 carbon atoms, preferably from 5 to 10 carbon atoms, an aromatic hydrocarbon radical containing from 6 to 15 carbon atoms, preferably from 6 to 13 carbon atoms, or an araliphatic hydrocarbon radical containing from 8 to 15 carbon atoms, preferably from 8 to 13 carbon atoms. Examples of suitable compounds are ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers, 1-isocyanato-3,3,5-trimethyl-5-isocyanatomethyl cyclohexane (German Auslegeschrift No. 1,202,785, U.S. Pat. No. 3,401,190), 2,4- and 2,6-hexahydrotolylene diisocyanate and mixtures of these isomers, hexahydro-1,3- and/or -1,4-phenylene diisocyanate, perhydro-2,4'- and/or -4,4'-diphenyl methane diisocyanate, 1,3- and 1,4-phenylene diisocyanate, 2,4- and 2,6-tolylene diisocyanate and mixtures of these isomers, diphenyl methane- 2,4'- and/or -4,4'-diisocyanate and naphthylene-1,5-diisocyanate.

According to the present invention, it is also possible to use for example triphenyl methane-4,4',4''-triisocyanate. Polyphenyl polymethylene polyisocyanates of the type obtained by condensing aniline with formaldehyde, followed by phosgenation, as described, for example, in British Pat. Nos. 874,430 and 848,671 can also be used. Other examples include m- and p-isocyanatophenyl sulphonyl isocyanates according to U.S. Pat. No. 3,454,606, perchlorinated aryl polyisocyanates of the type described, for example, in German Auslegeschrift No. 1,157,601 (U.S. Pat. No. 3,277,138), polyisocyanates containing carbodiimide groups of the type described in German Pat. No. 1,092,007 (U.S. Pat. No. 3,152,162) and in German Offenlegungsschriften Nos. 2,504,400, 2,537,685 and 2,552,350. Norbornane diisocyanates according to U.S. Pat. No. 3,492,330 are usable in the instant invention. Polyisocyanates containing allophanate groups of the type described, for example, in British Pat. No. 994,890, in Belgian Pat. No. 761,626 and in Dutch Pat. Application No. 7,102,524, as well as polyisocyanates containing isocyanurate groups of the type described, for example, in U.S. Pat. No. 3,001,973, in German Pat. Nos. 1,022,789, 1,222,067 and 1,027,394 and in German Offenlegungsschriften Nos. 1,929,034 and 2,004,048 are usable. Polyisocyanates containing urethane groups of the type described, for example, in Belgian Pat. No. 752,261 or in U.S. Pat. Nos. 3,394,164, and 3,644,457 are suitable. Polyisocyanates containing acylated urea groups according to German Pat. No. 1,230,778, and polyisocyanates containing biuret groups of the type described, for example, in U.S. Pat. Nos. 3,124,615, 3,201,372 and 3,124,605 and in British Pat. No. 889,050 as well as polyisocyanates produced by telomerization reactions of the type described, for example, in U.S. Pat. No. 3,654,106 are suitable. Polyisocyanates containing ester groups of the type described, for example, in British Pat. Nos. 965,474 and 1,072,956, in U.S. Pat. No. 3,567,763 and in German Pat. No. 1,231,688, and reaction products of the above-mentioned isocyanates with acetals according to German Pat. No. 1,072,385 and polyisocyanates containing polymeric fatty acid esters according to U.S. Pat. No. 3,455,883 are also suitable.

It is also possible to use isocyanate-group-containing distillation residues obtained in the commercial production of isocyanates. These may be, optionally, in solution in one or more of the above-mentioned polyisocyanates. It is possible to use any mixtures of the above-mentioned polyisocyanates.

In general, it is particularly preferred to use the commercially readily available polyisocyanates, for example 2,4- and 2,6-tolylene diisocyanate. Also preferred are any mixtures of these isomers ("TDI"). Preferred also are polyphenyl polymethylene polyisocyanates of the type obtained by condensing aniline with formaldehyde, followed by phosgenation ("crude MDI"). Polyisocyanates containing carbodiimide groups, urethane groups, allophanate groups, isocyanurate groups, urea groups or biuret groups ("modified polyisocyanates"), particularly modified polyisocyanates of the type derived from 2,4 and/or 2,6-tolylene diisocyanate or from 4,4'- and/or 2,4'-diphenyl methane diisocyanate are also preferred.

2. Optional starting components: compounds containing at least 2 isocyanate-reactive hydrogen atoms and having a molecular weight of generally from 400 to 10,000. Examples are compounds containing amino groups, thiol groups or carboxyl groups, preferably compounds containing hydroxyl groups. Particularly preferred are compounds containing from 2 to 8 hydroxyl groups and, above all, compounds having a molecular weight of from 500 to 7000, preferably from 1000 to 5000. Examples are polyesters, polyethers, polythioethers, polyacetals, polycarbonates and polyester amides containing at least 2, generally from 2 to 8, but preferably from 2 to 5 hydroxyl groups, of the type used in the production of homogeneous and cellular polyurethanes;

(a) The polyesters containing hydroxyl groups suitable for use are, for example, reaction products of polyhydric, preferably dihydric and, optionally, trihydric alcohols with polybasic, preferably dibasic, carboxylic acids. Instead of using the free polycarboxylic acids, it is also possible to use the corresponding polycarboxylic acid anhydrides or the corresponding polycarboxylic acid esters of lower alcohols or mixtures thereof for producing the polyesters. The polycarboxylic acids may be aliphatic, cycloaliphatic, aromatic and/or heterocyclic. They may also be substituted, for example by halogen atoms, and/or unsaturated.

Examples of carboxylic acids such as these and their derivatives are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid anhydride, fumaric acid, dimerized and trimerized unsaturated fatty acids, optionally in admixture with monomeric unsaturated fatty acids, such as oleic acid; terephthalic acid dimethyl ester and terephthalic acid-bis-glycol ester. Suitable polyhydric alcohols are, for example, ethylene glycol, 1,2- and 1,3-propylene glycol, 1,4- and 2,3-butylene glycol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, 1,2,4-butane triol, trimethylol ethane, pentaerythritol, quinitol, mannitol, sorbitol, formitol and methyl glycoside, also diethylene glycol, triethylene glycol, tetraethylene glycol and higher polyethylene glycols, dipropylene glycol and higher polypropylene glycols, dibutylene glycol and higher polybutylene glycols. The polyesters may contain terminal carboxyl groups. Polyesters of lactones, for example ε-caprolactone, or of hydroxy carboxylic acids, for example ω-hydroxy caproic acid, may also be used. According to the present invention, it is also possible to use castor oil as the polyol component. Combinations of TDI-residue powders and castor oil are particularly suitable for the production of polyurethane reactive adhesives and gap-filling compounds.

(b) The polyethers containing at least 2, generally from 2 to 8 and preferably 2 or 3 hydroxyl groups suitable for use in the present invention are also known. They can be obtained, for example, by polymerizing epoxides, such as ethylene oxide, propylene oxide, butylene oxide, tetrahydrofuran, styrene oxide or epichlorohydrin on their own, for example in the presence of Lewis catalysts, such as $BF_3$. They can also be obtained by the addition of these epoxides, preferably ethylene oxide and propylene oxide, with starter components containing reactive hydrogen atoms, such as water, alcohols, ammonia or amines. Examples are ethylene glycol, 1,3-propylene glycol or 1,2-propylene glycol, trimethylol propane, glycerol, sorbitol, 4,4'-dihydroxy diphenyl propane, aniline, ethanolamine or ethylene diamine. Sucrose polyethers of the type described, for example, in German Auslegeschriften Nos. 1,176,358 and 1,064,938 and formitol- or formose-started polyethers (German Offenlegungsschriften No. 2,639,083 and 2,737,951) may also be used in accordance with the invention. In many cases, it is preferred to use polyethers which contain predominantly primary OH-groups (up to 90% by weight, based on all the OH-groups present in the polyether). Polybutadienes containing OH-groups are also suitable for use in accordance with the present invention.

(c) Among the polythioethers, reference is made in particular to the condensation products of thiodiglycol on its own and/or with other glycols, dicarboxylic acids, formaldehyde, amino-carboxylic acids or amino alcohols. Depending on the co-components, the products in question are, for example, polythio mixed ethers, polythioether esters or polythioether ester amides.

(d) Suitable polyacetals are, for example, the compounds obtainable from glycols, such as diethylene glycol, triethylene glycol, 4,4'-dioxethoxy diphenyl dimethyl methane, hexane diol and formaldehyde. Suitable polyacetals may also be obtained by polymerizing cyclic acetals such as trioxane (German Offenlegungsschrift No. 1,694,128).

(e) Suitable polycarbonates containing hydroxyl groups are known per se. They can be obtained, for example, by reacting diols, such as 1,3-propane diol, 1,4-butane diol and/or 1,6-hexane diol, diethylene glycol, triethylene glycol, tetraethylene glycol, or thiodiglycol, with diaryl carbonates, for example diphenyl carbonate, or phosgene (German Auslegeschrift Nos. 1,694,080, 1,915,908 and 2,221,751; and German Offenlegungsschrift No. 2,605,024).

(f) Examples of suitable polyester amides and polyamides include, the predominantly linear condensate obtained, for example, from polybasic saturated or unsaturated carboxylic acids or their anhydrides and polyhydric saturated or unsaturated amino alcohols, diamines, polyamines and mixtures thereof.

(g) Suitable also are polyhydroxyl compounds already containing urethane or urea groups. Modified natural polyols, such as castor oil or carbohydrates, for example starch, may also be used. Addition products of alkylene oxides with phenol/formaldehyde resins or even with urea/formaldehyde resins may be used in accordance with the present invention.

(h) Before they are used in the polyisocyanate-polyaddition process, the above-mentioned polyhydroxyl compounds may be modified in various ways. Thus, according to German Offenlegungsschriften Nos. 2,210,839 (U.S. Pat. No. 3,849,515) and 2,544,195, a mixture of different polyhydroxyl compounds (for example, a polyether polyol and a polyester polyol) may be condensed by etherification in the presence of a strong acid to form a relatively high molecular weight polyol which is made up of different segments attached through ether bridges. Possible, also, in accordance with German Offenlegungsschrift No. 2,559,372, is to introduce amide groups into the polyhydroxyl compounds, or, in accordance with German Offenlegungsschrift No. 2,620,487, to introduce triazine groups by reaction with polyfunctional cyanic acid esters. The reaction of a polyol with a less than equivalent quantity of a diisocyanatocarbodiimide, followed by reaction of the carbodiimide group with an amine, amide, phosphite or carboxylic acid, gives polyhydroxyl compounds containing guanidine, phosphonoformamidine or acyl urea groups (German Offenlegungsschriften Nos. 2,714,289 2,714,292 and 2,714,293). In some cases, it is particularly, advantageous to completely or partly convert the relatively high molecular weight polyhydroxyl compounds into the corresponding anthranilic acid esters by reaction with isatoic acid anhydride, as described in German Offenlegungsschriften Nos. 2,019,432 and 2,619,840 and in U.S. Pat. Nos. 3,808,250, 3,975,428 and 4,016,143. Relatively high molecular weight compounds containing terminal aromatic amino groups are obtained in this way.

According to German Offenlegungsschrift No. 2,546,536 and U.S. Pat. No. 3,865,791, relatively high molecular weight compounds containing terminal amino groups are obtained by reacting NCO prepolymers with enamines, aldimines or ketimines containing hydroxyl groups, followed by hydrolysis. Further processes for producing relatively high molecular weight compounds containing terminal amino groups or hydrazide groups are described in German Offenlegungsschrift No. 1,694,152 (U.S. Pat. No. 3,625,871).

(i) According to the present invention, it is also possible to use polyhydroxyl compounds containing high molecular weight polyadducts and polycondensates or polymers in a finely dispersed or dissolved form. Polyhydroxyl compounds such as these are obtained, for example, by carrying out polyaddition reactions (for example reactions between polyisocyanates and amino-functional compounds) and polycondensation reactions (for example between formaldehyde and phenols and/or amines) in situ in the above-mentioned compounds containing hydroxyl groups. Processes such as these are described, for example, in German Auslegeschriften Nos. 1,168,075 and 1,260,142 and in German Offenlegungsschriften Nos. 2,324,134, 2,423,984, 2,512,385 2,513,815 2,550,796, 2,550,797, 2,550,833, 2,550,862, 2,633,292 and 2,639,254. It is also possible, in accordance with U.S. Pat. No. 3,869,413 or German Offenlegungsschrift No. 2,550,860, to mix an aqueous polymer dispersion with a polyhydroxyl compound and subsequently to remove the water from the mixture.

Polyhydroxyl compounds modified by vinyl polymers for example by polymerizing styrene and acrylonitrile in the presence of polyethers (U.S. Pat. Nos. 3,383,351, 3,304,273, 3,523,093, and 3,110,695; and German Auslegeschrift No. 1,152,536) or polycarbonate polyols (German Pat. No. 1,769,795; and U.S. Pat. No. 3,637,909) are also suitable for use in the present invention. Plastics having particularly good flameproof properties are obtained by using polyether polyols modified in accordance with German Offenlegungsschriften Nos. 2,442,101, 2,644,922 and 2,646,141. That is, particularly good flameproof properties are obtained by graft polymerization with vinyl phosphonic acid esters and, optionally, (meth)acrylonitrile, (meth)acrylamide or OH-functional (meth)acrylic acid esters. Polyhydroxyl compounds into which carboxyl groups have been introduced by radical graft polymerization with unsaturated carboxylic acids and, optionally, other olefinically unsaturated monomers (German Offenlegungsschriften Nos. 2,714,291, 2,739,620 and 2,654,746) may be used particularly advantageously in combination with mineral fillers.

Where modified polyhydroxyl compounds of the type mentioned above are used as a starting component in the polyisocyanate-polyaddition process, polyurethanes having considerably improved mechanical properties are formed in many cases.

Representatives of the above-mentioned compounds are described, for example, in High Polymers, Vol. XVI, "Polyurethanes, Chemistry and Technology", by Saunders-Frisch, Interscience Publishers, New York/London, Vol. I, 1962, pages 32 to 42 and pages 44 to 54 and Vol. II, 1964, pages 5–6 and 198–199, and in Kunststoff-Handbuch, Vol. VII, Vieweg-Hochtlen, Carl-Hanser-Verlag, Munich, 1966, for example on pages 45 to 71. It is, or course, possible to use mixtures of the above-mentioned compounds containing at least two isocyanate-reactive hydrogen atoms and having a molecular weight of from 400 to 10,000. Examples are mixtures of polyethers and polyesters.

In some cases, it is particularly advantageous to combine low-melting and high-melting polyhydroxyl compounds with one another (German Offenlegungsschrift No. 2,706,297).

3. As optional starting components: compounds containing at least two isocyanate-reactive hydrogen atoms and having a molecular weight of from 32 to 400. In this case, too, the compounds in question are compounds containing hydroxyl groups and/or amino groups and/or thiol groups and/or carboxyl groups. Preferably these compounds contain hydroxyl groups and/or amino groups which serve as chain extenders or cross-linkers. These compounds generally contain from 2 to 8, preferably from 2 to 4 isocyanate-reactive hydrogen atoms.

Again, it is possible to use mixtures of different compounds containing at least two isocyanate-reactive hydrogen atoms and having a molecular weight in the range of from 32 to 400.

Examples of such compounds are ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, dibromobutene diol (U.S. Pat. No. 3,723,392), glycerol, trimethylol propane, 1,2,6-hexane triol, trimethylol ethane, pentaerythritol, quinitol, mannitol, sorbitol, castor oil, diethylene glycol, triethylene glycol, tetraethylene glycol, higher polyethylene glycols having a molecular weight of up to 400, dipropylene glycol, higher polypropylene glycols having a molecular weight of up to 400, dibutylene glycol, higher polybutylene glycols having a molecular weight of up to 400, 4,4'-dihydroxy diphenyl propane, dihydroxy methyl hydroquinone, ethanolamine, diethanolamine, N-methyl diethanolamine, triethanolamine and 3-aminopropanol.

Other low molecular weight polyols suitable for the purposes of the present invention are the mixtures of hydroxy aldehydes and hydroxy ketones ("formose") or the polyhydric alcohols obtained therefrom by reduction ("formitol"). These are formed in the autocondensation of formaldehyde hydrate in the presence of metal compounds as catalysts and compounds capable of enediol formation as co-catalysts (German Offenlegungsschriften Nos. 2,639,084, 2,714,084, 2,714,104, 2,721,186, 2,738,154 and 2,738,512). In order to obtain plastics having improved fire resistance, these formoses are advantageously used in combination with aminoplast formers and/or phosphites (German Offenlegungsschriften Nos. 2,738,513 and 2,738,532). Solutions of polyisocyanate polyaddition products, particularly solutions of polyurethane ureas containing ionic groups and/or solutions of polyhydrazodicarbonamides, in low molecular weight polyhydric alcohols may also be used as the polyol component (German Offenlegungsschrift No. 2,638,759).

Examples of aliphatic diamines suitable for use are ethylene diamine, 1,4-tetramethylene diamine, 1,11-undecamethylene diamine, 1,12-dodecamethylene diamine and mixtures thereof. Also suitable are 1-amino-3,3,5-trimethyl-5-aminomethyl cyclohexane ("isophorone diamine"), 2,4- and 2,6-hexahydrotolylene diamine and mixtures thereof. Additionally perhydro-2,4'- and -4,4'-diaminodiphenyl methane, p-xylene diamine, bis-(3-aminopropyl)-methylamine, diaminoperhydro anthracenes (German Offenlegungsschrift No. 2,638,731) and cycloaliphatic triamines according to German Offenlegungsschrift No. 2,614,244 can be used. It is also possible to use hydrazine and substituted hydrazines. Examples of these are methyl hydrazine, N,N'-dimethyl hydrazine and their homologs. Also suitable are acid dihydrazides, for example carbodihydrazide, oxalic acid dihydrazide, the dihydrazides of malonic acid, succinic acid, glutaric acid, adipic acid, β-methyl adipic acid, sebacic acid, hydracrylic acid and terephthalic acid. Semicarbazido alkylene hydrazides such as β-semicarbazido propionic acid hydrazide (German Offenlegungsschrift No. 1,770,591), semicarbazido alkylene carbazinic esters such as 2-semicarbazido ethyl carbazinic ester (German Offenlegungsschrift No. 1,918,504) or even aminosemicarbazide compounds such as β-aminoethyl semicarbazido carbonate (German Offenlegungsschrift No. 1,902,931) are suitable. To control their reactivity, the amino groups may be completely or partly blocked by aldimine or ketimine groups (U.S. Pat. No. 3,734,894 and German Offenlegungsschrift No. 2,637,115).

Examples of aromatic diamines are bis-anthranilic acid esters (German Offenlegungsschriften Nos. 2,040,644 and 2,160,590) 3,5- and 2,4-diaminobenzoic acid esters (German Offenlegungsschrift No. 2,025,900) the diamines containing ester groups (described in German Offenlegungsschrift No. 1,803,635 (U.S. Pat. Nos. 3,681,290 and 3,736,350, 2,040,650 and 2,160,589), the diamines containing ether groups (German Offenlegungsschriften Nos. 1,770,525 and 1,809,172 (U.S. Pat. No. 3,654,364 and 3,736,295)). They also contain 2-halogen-1,3-phenylene diamines optionally substituted in the 5-position (German Offenlegungsschriften Nos. 2,001,722, 2,025,896 and 2,065,869). Additionally 3,3'-dichloro-4,4'-diaminodiphenyl methane, tolylene diamine, 4,4'-diamino diphenyl methane, 4,4'-diaminodiphenyl disulphides (German Offenlegungsschrift No. 2,404,976) are also suitable. Diamino-diphenyl dithio ethers (German Offenlegungsschrift No. 2,509,404), aromatic diamines substituted by alkyl thio groups (German Offenlegungsschrift No. 2,638,760), diamino-benzene phosphonic acid esters (German Offenlegungsschrift No. 2,459,491), aromatic diamines containing sulphonate or carboxylate groups (German Offenlegungsschrift No. 2,720,166), and the high-melting diamines described in German Offenlegungsschrift No. 2,635,400 are further examples. Examples of aliphatic-aromatic diamines are the amino-alkyl thioanilines according to German Offenlegungsschrift No. 2,734,574. Other suitable chain extenders are compounds such as 1-mercapto-3-amino-propane. Optionally substituted amino acids, for example, glycine, alanine, valine, serine and lysine, also optionally substituted dicarboxylic acids, for example succinic acid, adipic acid, phthalic acid, 4-hydroxy phthalic acid and 4-aminophthalic acid can be used as chain extenders.

In addition, isocyanate-monofunctional compounds may be used as so-called "chain terminators" in proportions of from 0.01 to 10% by weight based on the polyurethane solids. Examples of monofunctional compounds are monoamines, such as butyl- and dibutylamine, octylamine, stearylamine, N-methyl stearylamine, pyrrolidine, piperidine and cyclohexylamine, monoalcohols such as butanol, 2-ethyl hexanol, octanol, dodecanol, the various amyl alcohols, cyclohexanol and ethylene glycol monoethyl ether.

4. As optional additives and auxiliaries:

(a) Water and/or readily volatile inorganic or organic substances as blowing agents. Organic blowing agents are, for example, acetone, ethylacetate, halogen-substituted alkanes, such as methylene chloride, chloroform, ethylidene chloride, vinylidene chloride, monofluorotrichloromethane, chlorodifluoromethane or dichlorodifluoromethane. Other organic blowing agents are butane, hexane, heptane or diethyl ether. Inorganic blowing agents are, for example, air, $CO_2$ or $N_2O$. A blowing effect may also be obtained by adding compounds which decompose at temperatures above room temperature giving off gases, such as nitrogen. An example of this type of compound is azo compounds such as azodicarbonamide or azoisobutyronitrile. Other examples of blowing agents and information on the use of blowing agents can be found in Kunststoff-Handbuch, Vol. VII, by Vieweg and Hochtlen, Carl-Hanser-Verlag, Munich, 1966, for example on pages 108 and 109, 453 to 455 and 507 to 510.

(b) Known catalysts are tertiary amines. Examples of these are triethylamine, tributylamine, N-methyl morpholine, N-ethyl morpholine, N,N,N'N'-tetramethyl ethylene diamine, pentamethyl diethylene triamine and higher homologs (German Offenlegungsschriften Nos. 2,624,527 and 2,624,528). Also known are 1,4-diazabicyclo-(2,2,2)-octane, N-methyl-N'-dimethylaminoethyl piperidine, bis-(dimethyl-aminoalkyl)-piperizines (German Offenlegungsschrift No. 2,636,787), N,N-dimethyl benzylamine, N,N,-dimethyl cyclohexylamine, N,N-diethyl benzylamine, bis-(N,N-diethylaminoethyl)-adipate, N,N,N',N'-tetramethyl-1,3-butane diamine, N,N-dimethyl-β-phenyl ethylamine, 1,2-dimethyl imidazole, 2-methyl imidazole, monocyclic and bicyclic amidines (German Offenlegungsschrift No. 1,720,633), bis-(dialkylamino)-alkyl ethers (U.S. Pat. No. 3,330,782, German Auslegeschrift No. 1,030,558 and German Offenlegungsschriften Nos. 1,804,361 and 2,618,280), tertiary amines containing amide groups (preferably formamide groups) according to German Offenlegungsschriften Nos. 2,523,633 and 2,732,292. Suitable catalysts include known Mannich bases of secondary amines, such as dimethylamine. Aldehydes, preferably formaldehyde, or ketones, such as acetone, methylethyl ketone or cyclohexanone, and phenols, such as phenol, nonyl phenol or bisphenol are also suitable.

Tertiary amines containing isocyanate-reactive hydrogen atoms suitable for use as catalysts are, for example, triethanolamine, triisopropanolamine, N-methyl diethanolamine, N-ethyl diethanolamine, N,N-dimethyl ethanolamine, their reaction products with alkylene oxides, (such as propylene oxide and/or ethylene oxide) and secondary-tertiary amines according to German Offenlegungsschrift No. 2,732,292.

Other suitable catalysts are sila-amines containing carbon-silicon bonds, for example, German Pat. No. 1,229,290 (corresponding to U.S. Pat. No. 3,620,984). Examples are 2,2,4-trimethyl-2-silamorpholine and 1,3-diethylaminomethyl tetramethyl disiloxane.

Other suitable catalysts are nitrogen-containing bases. They include tetraalkyl ammonium hydroxides, also alkali metal hydroxides (such as sodium hydroxide), alkali metal phenolates, (such as sodium phenolate), or alkali metal alcoholates, (such as sodium methylate). Hexahydrotriazines may also be used as catalysts (German Offenlegungsschrift No. 1,769,043).

The reaction between NCO-groups and Zerewitinoff-active hydrogen atoms is also greatly accelerated by lactams and azalactams. An associate between the lactam and the compound containing acid hydrogen is initially formed. Associates such as these and their catalytic effect are described in German Offenlegungsschriften Nos. 2,062,288, 2,062,289, 2,117,576 (U.S. Pat. No. 3,758,444), 2,129,198, 2,330,175 and 2,330,211.

It is possible to use organometallic compounds, particularly organo tin compounds, as catalysts. In addition to sulphur-containing compounds, such as di-n-octyl tin mercaptide (German Auslegeschrift No. 1,769,367 and U.S. Pat. No. 3,654,927), preferred organo tin compounds are tin(II) salts of carboxylic acids, including tin(II) acetate, tin(II)octoate, tin(II)ethyl hexoate and tin(II) laurate and tin(IV)compounds, for example dibutyl tin oxide, dibutyl tin dichloride, dibutyl tin diacetate, dibutyl tin dilaurate, dibutyl tin maleate or dioctyl tin diacetate.

All the above-mentioned catalysts may, of course, be used in the form of mixtures. Combinations of organometallic compounds and amidines, aminopyridines or hydrazino pyridines (German Offenlegungsschrift Nos. 2,434,185, 2,601,082 and 2,603,834) are of particular interest.

Further representatives of suitable catalysts and information on the way in which they work can be found in Kunststoff-Handbuch by Vieweg and Hochtlen, Vol. VII, Carl-Hanser-Verlag, Munich 1966, for example on pages 96 to 102.

The catalysts are generally used in a quantity of from about 0.001 to 10% by weight, based on the total quantity of compounds containing at least two isocyanate-reactive hydrogen atoms.

(c) Surface-active additives are, for example, emulsifiers and foam stabilizers. Suitable emulsifiers are, for example, the sodium salts of castor oil sulphonates or salts or fatty acids with amines, such as diethylamine oleate or diethanolamine stearate. Alkali metal or ammonium salts of sulphonic acids, such as dodecyl benzene sulphonic acid or dinaphthyl methane disulphonic acid, or of fatty acids, such as ricinoleic acid, or of polymeric fatty acids may also be used as surface-active additives.

Particularly suitable foam stabilizers are polyether siloxanes, particularly water soluble types. The structure of these compounds is generally such that a copolymer of ethylene oxide and propylene oxide is attached to a polydimethyl siloxane residue. Foam stabilizers such as these are described, in U.S. Pat. Nos. 2,834,748, 2,917,480 and 3,629,308. In many cases, polysiloxane-polyoxyalkylene copolymers branched through allophanate groups according to German Offenlegungsschrift No. 2,558,523 are of particular interest.

(d) Reaction retarders are, for example, acid-reacting substances such as hydrochloric acid or organic acid halides, and cell regulators known per se, are paraffins or fatty alcohols or dimethyl polysiloxanes. Included in addition are pigments or dyes and flameproofing agents, for example tris-chloroethyl phosphate, tricresyl phosphate or ammonium phosphate and polyphosphate. Also included are stabilizers against the effects of aging and weather and plasticizers and fungistatic and bacteriostatic substances as well as fillers such as barium sulfate, kieselguhr, carbon black or whiting.

Further examples of surface-active additives and foam stabilizers, cell regulators, reaction retarders, stabilizers, flameproofing agents, plasticizers, dyes, fillers, fungistatic and bacteriostatic substances which may be used and information on the way these additives are used and their respective modes of action can be found in Kunststoff-Handbuch by Vieweg and Hochtlen, Vol. VII, Carl-Hanser-Verlag, Munich 1966, for example on pages 103 to 113.

As explained above, the TDI residue slags (component C of the process according to the invention) are by-products in the commercial production of 2,4- and-/or 2,6-tolylene diisocyanate. They accumulate in a quantity of approximately 10% by weight, based on the theoretically possible yield of monomeric diisocyanate. The generally still hot (>150° C.) tar-like residues are normally quenched with water. A large number of the free isocyanate groups are still present in the residue and react with the water to form polyurea groups (denaturing). A coarse-grained irregularly shaped, insoluble slag is being formed. This slag still has a small content of free NCO-groups (generally less than 15% by weight and, in most cases, from 1 to 10% by weight). However, it is virtually free from monomeric diisocyanates. In addition, the TDI residue slags also contain urea, biuret, uretdione, isocyanurate, carbodiimide, uretone imine and, in some cases, even methyl benzimidazolone groups and their biuretization products in varying quantitative ratios.

The slags are so highly cross-linked through these functional groups that, even having a mean particle size of $<5$ m$\mu$, they are substantially insoluble in inert organic solvents. Methylene chloride, cyclohexane, cyclohexanone, toluene, xylene or dichlorobenzene are examples of these inert solvents. Boiling these residue slags in the above solvents has no dissolution effect either. The residues do not dissolve even in boiling dimethyl formamide, but are only partly swollen. On heating, only a very small proportion, if any, of the TDI distillation residues soften at temperatures above about 250° C. Decomposition accompanied by the evolution of gas occurs at temperatures above about 280° C. without melting beforehand.

The coarse-grained TDI residue slag has to be size-reduced before it is used as a reactive filler. The very coarse-grained TDI residue slag preferably is first precomminuted to less than 3 mm in a comminuting machine, for example a cutting granulator or a hammer mill. It is then brought to the final particle size required using known wet or dry grinding processes. The present invention can also be used with TDI residue slags that have been quenched and denatured in water.

Where the TDI residues accumulate in water, for example in the above-described quenching process, any planned further reactions can be carried out in aqueous phase. It is particularly economical and environmently sound to carry out final size-reduction by wet fine-grinding or superfine-grinding in batch-type or continuous machines arranged one behind the other in one or two stages. The solids concentrations during wet grinding are preferably between 15 and 45% by weight. In addition to tube and ball mills, it is particularly advantageous to use toothed colloid mills, trigonal gear ring mills, corundum disc mills and stirrer-equipped ball mills. A combination of a toothed colloid mill and a stirrer-equipped ball mill is suitable, for example, for particularly fine grain sizes.

Size-reduction in the aqueous phase may be controlled in such a way that, under the effect of the heat generated during grinding (which may optionally be regulated by cooling) and because of the formation of freshly cut surfaces accompanied by a considerable increase in the surface area, the TDI-residue slag reacts with the water even in the absence of externally applied heat. It is also possible, in cases where grinding is carried out in an aqueous medium, to effect other reactions by the addition of reactive compounds. Examples are polyaddition reactions using NH-compounds or polycondensation reactions using carbonyl compounds.

It is best, depending on the particle size, to use a deficit of NH-compounds in heavy, aqueous dilution and to stir the reaction mixture with intense turbulence, to produce a more fine-grained TDI residue. This process can also be used during this grinding process.

In this way, for example where denaturing is carried out in an aqueous ammonia solution or in ammonia-yielding solutions, such as an ammonium (bi)-carbonate solution, a TDI residue slag which has an increased content of external urea groups, some of which are only monosubstituted, are particularly readily accessible for subsequent condensation reactions is obtained.

Denaturing in the presence of ionomeric amines leads directly to TDI residues containing salt groups or capable of salt formation.

It is possible during the grinding operation to replace some or all of the water by another liquid, optionally containing NCO-reactive groups, which is selected having regard to the subsequent further processing of the ground residue.

The TDI residue slags obtained after wet grinding either contain different quantities of free NCO-groups or are free from NCO-groups depending on the procedure adopted. They may be further processed either in the form of very finely divided suspensions or pastes. Alternatively after isolation of the suspending agent they may be used as powders in the same way as the TDI residue powders obtainable by dry grinding.

TDI residue slags usable for dry grinding have been preground to less than 2–3 mm and predried preferably at temperatures below 50° C. and have a moisture content of not much more than 10% by weight and preferably less than 5% by weight. The choice of the particular machines used for dry grinding is governed by the final particle size and particle size distribution required and the grinding costs. In comparison with plastics, the residue slags are very hard by virtue of their high degree of cross-linking and may be ground without softening at temperatures of up to 250°–300° C. This grinding can be done in conventional size-reducing machines free from any cooling problems. This is of particular importance in obtaining very fine particle sizes in the range of from less than 1 m$\mu$ to 5 m$\mu$. These very fine particle sizes of less than 5 m$\mu$ and preferably less than 1 m$\mu$ are particularly preferred for the present invention, particularly for the production of polyurethane foams.

Grinding may be carried out, for example, in pinned-disc mills, ball mills or baffle plate mills. It may be also done in air-stream mills, such as cross-beater mills, gear ring mills or turbine mills. It is particularly advantageous to use steam-jet or air-jet mills because, in mills of this type, size-reduction is primarily obtained by inter-particle collisions, less being obtained by wall collisions.

Dry grinding may, also be carried out by single-stage and multistage, batch-type or continuous grinding processes. It is possible to produce commercial quantities of very fine TDI-residue powders. These powders contain free isocyanate groups or, very fine-grained derivatives of TDI residue slags. The latter results by adding liquid, preferably low boiling reaction components effecting a modification reaction even in the gaseous phase during grinding.

Cross-beater mills, gear ring mills and turbine mills are preferably used in multistage grinding processes.

Surprisingly size reduction of the TDI residue slag may also be carried out in conventional mixing devices equipped with ploughshare-like mixing elements and (preferably multistage) cutter heads. Apparatus of this kind are commercially available on both a laboratory and a technical scale. These mixers act both as a mill and reactor for the modification reactions mentioned above.

As a result of grinding, reactive groups included in the residue slag are made available for a variety of different chemical reactions described in detail below.

The finely divided TDI residue slag (component C of the process according to the present invention) used as a reactive organic filler in accordance with the invention may be used both by itself and also in admixture with each of the other components used. When the residue powder is stirred into monomeric liquid polyisocyanates (component A), the concentration of free isocyanate groups begins to decrease after only a few hours, accompanied by an increase in viscosity. It is advisable in cases where components A and C are to be used together to carry out premixing shortly before the reaction with component B. In contrast, the TDI residue powders, particularly when they have been very finely ground (average particle size preferably less than 5 m$\mu$), form with liquid polyhydroxyl compounds (component B) suspensions which can be stored for several days. The stability of these dispersions in storage is increased to several months if some of the free isocyanate groups present in the powdered TDI residue are reacted with hydroxyl groups of the polyhydroxyl compound by briefly heating the suspension (preferably to temperatures between 80° and 150° C.).

It may be regarded as surprising that NCO-group-containing prepolymers of the suspensions and an excess of polyisocyanate are also extremely stable in storage, whereas, mixtures of the residue powder with polyisocyanates are less stable in storage.

Before they are used, the TDI residue powders may also be otherwise chemically modified, particularly by reaction of the small quantities of free isocyanate groups. The modifying agent may be used in gaseous form and/or in solution in an inert organic solvent or in water.

It is possible, for example, to pass ammonia, gaseous amines or gaseous alcohols through the powdered slag, quickly reacting the free isocyanate groups in an exothermic reaction forming urea or urethane groups. The preferred method uses the counter-current principle and therefore no mechanical mixing is needed. The reaction time can be shorter than one minute. These functional groups are particularly accessible to condensation reactions with carbonyl compounds, particularly formaldehyde. These carbonyl groups can be passed through the powder in gaseous form either at the same time or afterwards. Instead of using formaldehyde and ammonia, however, it is also possible to use urotropin under hydrolyzing conditions to form methylene-urea bridges.

Another possibility for modification is reaction with steam. The reaction of the isocyanate groups with water takes place very slowly at temperatures below 100° C. Quantitative polyurea formation may be quickly obtained by applying reaction temperatures distinctly above the boiling point of water and preferably above 130° C. Where adequately size-reduced TDI residue slag is used, it is sufficient to expose it to the above-mentioned temperatures wetted with water. Thereafter the residue powder contains virtually no more free NCO-groups. It is also possible to use alcohols or carboxylic acids (for example, acetic acid) to react with the free NCO-groups of the powder.

Any primary and secondary monoamines and polyamines, primary, secondary and tertiary monoalcohols and polyalcohols also aldehydes, ketones and carboxylic acids which may readily be converted into gaseous form may be used for the above-mentioned modification reactions. Examples include ethylamine, diethylamine, butylamine, dibutylamine, methanol, ethanol, propanol, butanol, ethylene glycol, diethyleneglycol, propylene glycol, dipropylene glycol, formaldehyde, acetaldehyde, propionaldehyde, butyraldehyde, acetone, methylethyl ketone, acetic acid and formic acid.

Particularly suitable reactions for modifying the TDI residue powder from the aqueous phase or from an organic medium are catalyzed reactions of the isocyanate groups with one another. An example is the formation of uretdione groups under the influence of trisubstituted phosphines as catalysts or the formation of carbodiimide groups under the influence of phospholine oxide. It is also possible to add weakly acid compounds (for example bisulphite or other isocyanate donors) to the free isocyanate groups of the TDI residue slag which may subsequently be split off by applying elevated temperatures with the resulting liberation of the isocyanate groups. A further possibility for modification is the addition of amines, amides, phosphites or carboxylic acids to the carbodiimide groups of the TDI distillation residue, in which case guanidine, phosphonoformamidine or acyl urea groups are formed (cf. German Offenlegungsschriften Nos. 2,714,289, 2,714,292 and 2,714,293). The reactions with ammonia, amines, alcohols and carbonyl compounds described above in connection with modification from the gas phase may also be carried out in water or in an organic solvent as the reaction medium. In addition to the compounds already mentioned, other suitable amines and alcohols are the chain extenders and chain terminators described above as component B. Carbonyl compounds suitable for modification reactions are mentioned, for example, in German Offenlegungsschriften Nos. 2,324,134, 2,639,254 and 2,713,198. As already mentioned, the preferred carbonyl compound is formaldehyde.

In addition to water, suitable reaction mediums for the above-mentioned chemical modification reactions are the known organic solvents which boil at temperatures preferably below 150° C. Particularly preferred are those that boil below 130° C. These liquids, as mentioned above, are essentially non-solvents for the residue powder. Examples of such organic solvents are methylene chloride, acetone, petroleum ether, cyclohexane, ethylacetate, benzene, toluene, and xylene. After the modification reaction, the liquid reaction medium may be removed by filtration and drying or by distillation. In many cases, it is sufficient to use only a very small quantity of liquid (frequently less than 10% by weight, based on the residue powder) in order to dissolve the modifying agent or to disperse it uniformly in the TDI residue powder. In cases where they require temperatures above the boiling point of the solvent used, the abovementioned modification reactions can be carried out in a pressure vessel.

In some cases, it is desirable to introduce cationic and/or anionic groups or groups capable of salt formation into the TDI residue powders. This may be done by reacting the free NCO-groups of the powder, in a liquid reaction medium, with compounds containing acid hydrogen atoms as well as ionic groups or groups capable of salt formation. Compounds such as these are described, for example, in German Offenlegungsschrift No. 2,550,797. It is also possible to introduce olefinically unsaturated groups into the reactive filler powders. This may be done by using reactants containing olefinically unsaturated groups in any of the above-described modification reactions either in the gas phase or in an inert liquid reaction medium. Examples of these reactants are unsaturated alcohols, such as allyl alcohol, or the hydroxyethyl esters of acrylic or methacrylic acid, unsaturated carbonyl compounds, such as croton aldehyde or acrolein, or unsaturated carboxylic acids, such as acrylic acid, methacrylic acid, maleic acid or fumaric acid. Filler powders containing copolymerizable unsaturated groups are of particular interest where crosslinking or polymerization reactions are subsequently carried out in the polyurethane plastic ultimately obtained. Polyhydroxyl compounds containing copolymerizable groups (for example, unsaturated polyesters or polybutadienes containing hydroxyl groups) are frequently used as component B. It is also possible to subsequently swell the final polyurethane plastic in a polymerizable monomer such as acrylonitrile, styrene, butadiene, neoprene, acrylic acid esters, methacrylic acid esters, vinyl chloride or vinylacetate, and then to initiate the polymerization reaction using a radical initiator by known methods.

The very finely ground NCO-containing or NCO-free TDI residue slags may also be converted into hydrophilic aromatic polysulphonic acid derivatives. This may be done, for example, by suspending the TDI residue slags in chlorinated hydrocarbons, by reaction with sulphur trioxide or chlorosulphonic acid, followed by hydrolysis. In this type of process some of the sulphonic acid groups enter into addition reactions with the carbodiimide groups of the slags.

If amines, ammonia or alkali are used, the corresponding aryl sulphonic acid salts are formed. If compounds containing tertiary nitrogen have been introduced the sulphonic acid TDI residue powders can form amphoteric systems where both the positive charge and negative charge are situated in the same molecule. Separately produced anionic and cationic TDI residue powders may be mixed in any ion equivalent ratio and used, as ion exchangers.

In special cases, when the reaction mixture passes a pasty transition state, the above-mentioned modifying may advantageously be carried out in self-cleaning screw machines. Suitable extruders are described, e.g. in "Schneckenmaschinen in der Verfahrenstechnik" by H. Hermann, Springer-Verlag, Berlin/Heidelberg/New York, 1972, and in U.S. Pat. Nos. 3,963,679 and 3,993,641, incorporated herein by reference.

It is known in the art that chemical reactions may be carried out in extruders. Generally, however, thermoplastic polymers are produced or worked up in such screw machines, temperatures above the softening point of the material being applied. Surprisingly even the modification reactions according to the invention wherein non-meltable cross-linked TDI residue slags after denaturing with water are used may be carried out in the above-mentioned extruders, free-flowing, very finely divided powders being directly obtained at the head of the extruder.

The TDI residue powders may also be mixed at any time with powder-form polymeric hydrocyanic acids (so-called azulmic acids). Azulmic acids also contain reactive groups (particularly amino groups) which are capable of reacting both with the addable groups of the TDI residue (for example NCO and carbodiimide groups) and also with the modifying agents (for example carbonyl compounds) optionally used in the working up of the residues. Processes for producing azulmic acids and for stabilizing them against the elimination of hydrocyanic acid are described, for example, in Houben-Weyl, Methoden der Organ. Chemie (1952), Vol. 8, page 261, in Angew. Chem. 72 (1960), pages 379-384, in German Patent Nos. 662,338 and 949,600 and in U.S. Pat. applications Ser. Nos. 011,554 and 011,542, both filed Feb. 12, 1979.

All the described modification reactions on the powdered TDI distillation residue may be carried out before it is used in the process according to the present invention. It is also possible to carry out these modification reactions (for example condensation reactions with carbonyl compounds and, optionally, compounds suitable for aminoplast formation or even polymerization reactions) parallel with the process according to the invention, i.e., at the same time as the polyisocyanate polyaddition reaction.

These optionally chemically modified TDI residue powders are used in a quantity of more than 2% by weight, generally from 2 to 90% by weight, preferably from 5 to 60% by weight and, with particular preference from 10 to 40% by weight, based on the sum of components A, B and C. In most cases, they increase the hardness of the polyurethane end products and their tensile strength to such an extent that there is little or no need to use the normal low molecular weight chain extenders.

The reaction components A, B and C are reacted by the one-shot process known per se, by the prepolymer process or by the semi-prepolymer process, in many cases using machines of the type described for example in U.S. Pat. No. 2,764,565. Particulars of processing machines which may be used in accordance with the present invention can be found in Kunststoff-Handbuch, Vol. VII, published by Vieweg und Hochtlen, Carl-Hanser-Verlag, Munich 1966, for example on pages 121 and 205. It is also possible, in accordance with the present invention to produce polyisocyanurate plastics (from components A and C).

In the production of foams, it is possible in accordance with the present invention for foaming to be carried out in closed molds. To this end, the reaction mixture is introduced into a mold. Suitable mold materials are metals, for example aluminum, or plastics, for example epoxide resins. The foamable reaction mixture foams in the mold and forms the molding. Foaming in the mold may be carried out in such a way that the molding has a cellular structure at its surface and also in such a way that the molding has a compact skin and a cellular core. It is possible to introduce the foamable reaction mixture into the mold in such a quantity that the foam formed just fills the mold. It is also possible, to introduce into the mold more foamable reaction mixture than is required for filling the interior of the mold with foam. This particular technique is known as "overcharging" and is known, for example, from U.S. Pat. Nos. 3,178,490 and 3,182,104.

Where foaming is carried out in molds, "external release agents" known per se, such as silicone oils, are frequently used. It is also possible, to use so-called "internal release agents", optionally in admixture with external release agents, as described, for example, in German Offenlegungsschriften Nos. 2,121,670 and 2,307,589.

It is also possible to produce cold-hardening foams (cf. British Pat. No. 1,162,517 and German Offenlegungsschrift No. 2,153,086).

It is also possible to produce foams by block foaming or by the laminator process known per se.

Of particular technical interest are TDI residue powders having been modified with an excess of glycol as described above and containing free hydroxyl groups after the modification reaction. Powders of this kind may be reacted with polyisocyanate according to the invention, storage-stable, free-flowing powders being obtained which surprisingly have thermoplastic properties and may be processed into moldings at elevated pressure and temperature, preferably at about 150° to 230° C. and 5 to 100 bar/cm$^2$.

In one particular variant of the process of the present invention, the TDI residue powders are used as reactive fillers (and at the same time, binding agents) in the production of chipboard by bonding or impregnating starting materials containing ligno-cellulose with polyisocyanates.

It is known that boards or moldings can be produced in high-temperature presses by bonding ligno-cellulose-containing fibers, chips or layers. Previously, the condensation products of formaldehyde with urea, melamine or phenol were preferably used as binders for this purpose. The materials containing ligno-cellulose produced in this way, however, are unsatisfactory in their durability and behavior in the presence of moisture under conditions to which they are exposed, particularly in the construction industry. In order to improve the stability and moisture resistance of the products and also to increase their mechanical strength, it has also been proposed to use polyisocyanates as binders and/or impregnating agents. In addition to their quality-improving properties, polyisocyanates have far-reaching processing advantages as binders, as disclosed in German Offenlegungsschrift No. 2,109,686. Suitable binders are any of the above-mentioned polyisocyanates. It is preferred, in accordance with German Offenlegungsschrift No. 2,711,858, to use crude diphenyl methane diisocyanate and particularly a product having a viscosity at 25° C. of from 50 to 600 mPas and an NCO-content of from 28 to 32% by weight containing from 35 to 70% by weight of diisocyanatodiphenyl methanes, of which from approximately 1 to 8% by weight are made up by the 2,4'-isomer and from 0 to 2% by weight by the 2,2'-isomer.

It is known that polyisocyanates have significant advantages over conventional binder resins for the production of chipboard or moldings based on ligno-cellulose containing materials by virtue of the fundamentally different binding mechanism.

Since the binders in question are anhydrous binders, there is no need for as much water to be evaporated in the high temperature press. Together with the high reactivity of the polyisocyanates, this provides for very short pressing times. The otherwise necessary intensive drying of the chips is also superfluous, making the process less expensive. In addition, where polyisocyanate binders are used, dust from components of the starting material containing ligno-cellulose do not have a troublesome effect. This results in a better utilization of the starting material and reduces the danger of operational disturbances during production of the chipboard. In addition, no effluent problems arise because a closed system is used. For the same quantity of binder, the flexural and transverse tensile strengths of the materials are increased and their ability to swell under the effect of moisture and water is reduced. In addition, the binding with polyisocyanates of agricultural waste materials which are otherwise difficult to bind, such as straw, rice husks, alfa grass, etc., contributes towards reducing raw material supply and pollution control problems.

In particular, the use of polyisocyanates reduces or eliminates the serious problem of pollution and the health risk caused by the excape of gaseous formaldehyde from chipboard bonded with urea-formaldehyde resins or (optionally modified) melamine/urea-formaldehyde resins.

It has been possible to utilize all these advantages of polyisocyanates as binders for materials containing ligno-cellulose to a limited extent on an industrial scale. This is because these polyisocyanates are frequently much more expensive than phenol/formaldehyde and urea/formaldehyde resins. If some of the necessary polyisocyanates are replaced by the TDI residue powders materials superior in many respects to the chipboard and moldings obtained using conventional polyisocyanates as binders are produced. These materials can be produced particularly economically by using the previously virtually worthless TDI distillation residue.

Quite unexpectedly, the flame-proofing properties of the chipboards and moldings is significantly improved if the TDI residue powders are used as an additional binding agent according to the invention.

Suitable starting materials containing lignocellulose which may be bound with a mixture of liquid polyisocyanate and optionally chemically modified TDI residue powder are, for example, wood, bark, cork, bagasse, straw, flax, bamboo, alfa grass, rice husks, sisal and coconut fibers. The material may be present in the form of granulates, chips, fibers or powder. It may have a water content of from 0 to 35% by weight, preferably from 5 to 25% by weight. From approximately 1 to 70% by weight, preferably from 1.5% to 8% by weight of polyisocyanate and from 2 to 60% by weight, preferably from 5 to 40% by weight, and with particular preference, from 10 to 30% by weight of finely divided, (optionally chemically modified) TDI residue slag, based on the total weight of the molding, are added to it (in any order). This is followed by processing (generally under the effect of heat and pressure) to form boards or moldings.

Laminated boards or moldings may also be produced in the same way from veneers, papers or fabrics. Laminated boards or moldings may also be produced from veneers and strip-form, bar-form or rod-form center layers (so-called cabinet-making boards). This is done by treating these veneers with a polyisocyanate and the TDI-residue powder and subsequently pressing them with the center layers, generally at an elevated temperature and pressure. It is preferred to apply temperatures in the range of from 100° to 250° C. and, with particular preference, in the range of from 130° to 200° C. The initial pressure applied is preferably between 5 and 150 bars. The pressure subsequently falls, generally towards zero, in the course of the pressing operation.

The binder combinations (liquid polyisocyanate on the one hand and powdered TDI residue slag on the other hand) may also be used in combination with polyhydroxyl compounds, of the type known per se from polyurethane chemistry, in an NCO/OH-ratio of from 1:2 to 10:1 and preferably in an NCO/HO-ratio of from 1.5:1 to 1:1.

For reasons of stability in storage, it is advantageous to use a combination of finely divided TDI residue and polyol in the form of a stable NCO-prepolymer with the liquid polyisocyanate.

It is also possible, to use the individual components separately or in the form of a reactive mixture. It is preferred to premix the polyhydroxyl compound with the TDI residue powder to form a storable suspension. It is also possible to add known blowing agents in a quantity of from about 0.5 to 30% by weight, based on the binder or impregnating agent. It is also possible to add other additives which influence foam formation or the chemical reaction between polyisocyanates, ligno-cellulose-containing material and optionally, polyhydroxyl compounds. Examples are stabilizers, catalysts, and activators, in a quantity of from 0.05 to 10% by weight, based on the binder or impregnating agent. All these starting materials which may be used in the production of moldings containing ligno-cellulose are described in detail above in connection with the production of polyurethane plastics.

These binder combinations (liquid polyisocyanate; finely divided TDI residue slag) may also be combined with the aqueous solutions of condensation products of formaldehyde with urea and/or melamine and/or phenol predominantly used in the woodwork industry. They may also be combined with other less widely used binders and impregnating agents such as sulphite waste liquor or tannin. The binders of the present invention may be mixed with these additional binders in a ratio of from 1:10 to 10:1 and preferably in a ratio of from 1:5 to 5:1. The binders of the present invention and the additional binders are used either separately or in admixture.

Combinations such as these are particularly advantageous in the production of laminated boards having special properties. For example, conventional adhesives may be added to the outer layers while combinations of liquid polyisocyanate and powdered TDI residue of the present invention may be added to one or more inner layers, followed by pressing.

By virtue of their outstanding mechanical properties and their reduced flammability, these boards or moldings based on starting materials containing ligno-cellulose are particularly suitable for use in the construction industry. In order to provide the boards or moldings with the needed resistance to fungi, insects or fire, it is possible to add to the binders conventional organic or inorganic protectives. These protective additives are used either in pure form or in solution. Quantities of from about 0.05 to 30% by weight, preferably in quantities of from 0.5 to 20% by weight, based on the starting materials containing ligno-cellulose are used. Suitable solvents are water or organic solvents, for example residue oils from petroleum refining, and chlorinated hydrocarbons etc. In general, this does not affect the quality of bonding. In contrast to boards bonded with phenol/formaldehyde resins, these boards are advantageously unaffected either by any efflorescence of salts or by so-called "bleeding".

By virtue of the high bond strength of the binders used, the moldings impregnated or bonded with them tend to adhere to the surfaces of the hot presses or molds. This can be avoided by the use of release agents added to the binder. Another remedy is to apply the release agents either in pure form or in solution to the metallic surfaces coming into contact with the surface of the molding. Suitable release agents are any of the substances previously proposed for this purpose. It is preferred, in accordance with German Offenlegungsshrift No. 2,325,926 to use compounds which, in isocyanates, catalyze the formation of isocyanurates. Examples are phenol-Mannich bases, derivatives of hexahydrotriazine or alkali metal salts of carboxylic acids. It is possible with these binder combinations to obtain significant improvements in the manufacture of chipboard in regard both to its mechanical properties and its processing properties. It is possible in the case of wood chipboard to obtain a 30 to 50% increase in flexural strength (in addition to improvements in other mechanical properties) for the same quantity of binder based on phenol/formaldehyde or urea/formaldehyde resins, or to obtain the same mechanical property spectrum for a 25% to 70% reduction in the amount of binder used.

In all the described variants of the process, the TDI residue powders may also be used with powder-form azulmic acids in any quantitative ratios, for example from 90:10 to 10:90.

The following examples serve to illustrate the process of the invention without restricting it in any way. In the Examples all quantities quoted represent parts by weight or percent by weight, unless otherwise indicated.

The following denatured TDI residues were used for the Examples:

TDI-residue I:

From the production of monomeric tolylene diisocyanate in a 2,4/2,6-isomer ratio of 80:20; particle size: <10 mµ (50% by weight <4 mµ); NCO-content: 9.9%.

TDI-residue II:

From the production of monomeric tolylene diisocyanate in a 2,4/2,6-isomer ratio of 65:35; particle size; <20 mµ (50% <12 mµ); NCO-content: 6.9%.

Production of TDI-rsidues I and II:

The phosgenation residue remaining in the sump during the distillation of tolylene diisocyanate (approximately 10% of the theoretical monomer yield) is run off in the form of a highly viscous liquid having a temperature of from about 150° to 180° C. into a stirrer-equipped vessel containing at least twice the quantity of water. A large number of the free isocyanate groups react to form polyurea groups. The reaction is accompanied by the evolution of carbon dioxide. This quenching and denaturing process, is accompanied by intense heating of the water. This results in the formation of a coarse-grained, very irregularly shaped porous residue slag. The water is run off into a trough until the water content still present in the slag has fallen to below 10% by weight. More advantageously for subsequent preliminary size reduction in a hammer mill, it fails to below 5% by weight. Depending on the grain size, the NCO-content of the quenched and denatured residue slag wetted with water gradually decreases over a period of days-to weeks at room temperature. This reduction in the content of free isocyanate groups is prevented by drying the quenched and denatured TDI-residue slag. This is done by pregrinding to a grain size of less than 3 mm in a hammer mill and then drying at temperatures below 50° C. in a recirculating air cabinet until the water content has fallen to below 0.2% by weight, followed by storage in the absence of air. Fine-grinding is carried out in a single passage through an air-jet mill.

The free isocyanate group content of the residue powder was determined on the finely ground samples at a temperature of 50° C.

EXAMPLES

EXAMPLE 1

Production of a homogeneous polyurethane elastomer

Method:

128.5 parts of TDI-residue I, 300 parts of a polyester of 1,6-hexane diol, 2,2-dimethyl-1,3-propane diol in a molar ratio of 22:12 and adipic acid having an OH-number of 62 and an acid number of 1 ("polyester 1"), and 46.8 parts of 4,4'-diisocyanatodiphenyl methane.

Polyester 1 is introduced at room temperature into a stirrer-equipped vessel. The TDI-residue powder 1 is stirred in and the mixture subsequently heated to 80° C. The diphenyl methane diisocyanate is then added, followed by stirring for 5 minutes in a water jet vacuum. The viscous reaction mixture is poured into a 3 mm deep steel mold and heated for 24 hours at 100° C.

EXAMPLE 2

The procedure is as described in Example 1, except that the free isocyanate groups in the TDI-residue are reacted in polyester 1 for about 3 to 4 hours at from 90° to 100° C. until the NCO-content has fallen to below 0.2%. Only then is the diphenyl methane diisocyanate stirred in at 80° C. in a water jet vacuum.

Comparison Test:

300 parts of polyester 1 and 49 parts of 4,4'-diisocyanatodiphenyl methane are mixed under the conditions described in Example 1 (without addition of the TDI-residue powder). The reaction mixture is heated in a steel mold.

The mechanical properties of the elastomers obtained in accordance with Examples 1 and 2 and the comparison test are set out in the following Table:

TABLE 1

| Example No. | 1 | 2 | Comparison |
|---|---|---|---|
| Tensile strength [MPa] | 4.8 | 7.5 | 0.6 |
| Elongation at break [%] | 1050 | 1190 | 1400 |
| Tear propagation resistance [N/cm] | 130 | 175 | 78 |
| Shore hardness A | 56 | 61 | 42 |

The polyurethane elastomers produced in accordance with Examples 1 and 2 are easy to remove from the mold and have a dry feel. In contrast, the polyurethane produced in accordance with the Comparison Example is slightly tacky and difficult to remove from the mold.

EXAMPLE 3

Solvent-free adhesive or gap-filling compound

Method:

100 parts of TDI-residue II, 150 parts of castor oil (OH-number 165) and 80 parts of commercial diphenyl methane diisocyanate (NCO content 30%).

The castor oil is introduced with intensive stirring at room temperature into a freshly prepared paste of the TDI-residue and the commercial diphenyl methane diisocyanate. After 30 to 45 minutes, the reaction mixture is ready for use as an adhesive or gap filling compound. The TDI-residue considerably increases the shear strength and thermal stability under load of the fully reacted polyurethane in comparison to a control sample free from the TDI-residue powder without adversely affecting the flexibility of the fully reacted plastic.

EXAMPLE 4

Production of a flexible polyurethane form

A suspension is prepared, with intensive stirring, from the following components at room temperature:

80 parts of a trimethylol-propane-started polyether of propylene oxide and ethylene oxide (OH-number: 34; approximately 80 mol % of primary OH-groups), 20 parts of TDI-residue I, 3 parts of water, 0.2 part of triethylene diamine 0.3 part of 2-dimethylaminoethanol 0.8 part of a standard commercial-grade polysiloxane foam stabilizer (Bayer AG's OS 15) and 0.22 part of tin-(II)-octoate.

36.1 parts of tolylene diisocyanate (2,4-/2,6-isomer ratio 72:28) are stirred into this suspension. After 10 seconds, the reaction mixture assumes a creamy consistency. The foam has a rise time of 80 seconds and a gel time of 140 seconds. The fully reacted foam has the following mechanical properties:

Gross density (DIN 53420) 33 kg/m$^3$
Tensile strength (DIN 53571) 160 kPa
Elongation at break (DIN 53571) 190%
Compression hardness (DIN 53577) 5.5 kPa.

In comparison, a similar flexible foam produced without the TDI residue powder has a compression hardness of only 4.8 kPa. The foam produced in accordance with the present invention shows distinctly reduced inflammability in relation to the comparison sample.

EXAMPLE 5

Production of a rigid polyurethane foam 38 parts of a liquid commercial diphenyl methane diisocyanate (NCO-content 30%) are stirred over a period of 10 seconds into a freshly prepared mixture of 100 parts of a polyether obtained by the propoxylation of sucrose having an OH-number of 30 and a water content of 2.1%, 66 parts of TDI-residue I 0.7 part of N,N-dimethyl cyclohexylamine and 40 parts of monofluorotrichloromethane, The reaction mixture is then poured into an open mold.

After 90 seconds, the foam has gelled. Its unit weight is 24.5 kg/m$^3$.

The tough rigid foam produced is distinguished by its distinctly reduced inflammability. If the proportion of TDI-residue powder I used is increased to a total of 100 parts, a rigid foam which is even self-extinguishing is obtained.

EXAMPLES 6 TO 22

Production of pressable compositions and pressed sheets

1. General Procedure (Formulations of table 2)

1.1 Diol modification

In a horizontally arranged cylindrical container comprising ploughshare-like mixing elements with a multistage cutter head, the TDI-residue preground to less than 3 mm is three-dimensionally brought into a state of intensive movement in a weak stream of nitrogen and heated to 90°–100° C. Further size reduction is obtained both by means of the cutter head, which rotates at high speed, and by intercollision of the very hard residue particles or by impact on the wall of the drum. During this fine size-reduction, the diols used are spraying in under pressure in the quantities indicated in the Table in such a way that they are atomised into the fluidised material at an acute angle to the cutters. At a reaction temperature of around 100° C., the greater part of residual isocyanate content which may still be present in the TDI-residue powder reacts in 30 minutes to 2 hours, depending on the particle size, a corresponding equivalent quantity of the diol used reacting to form urethane groups and, optionally, polyurethane compounds containing terminal hydroxyl group. Under the described conditions, excess diol is distributed uniformly in very thin layers over the surface of the TDI-residue particles. If, in cases where TDI-residues denatured with water are used, traces of residual moisture are still present, the highly hydrophilic diols may partially penetrate into the often finely porous particles. In this way, it is possible to obtain free-flowing, very finely divided and non-dusting powders which, in the case of fine particles, absorb up to 20 or even 40% by weight of diol which is liquid at room temperature and, in spite of this, have a dry appearance.

1.2 Polyisocyanate polyaddition reaction

The TDI residue powder modified with excess diol in the first reaction stage is reacted with the compounds containing isocyanate groups described below, either in an immediately following reaction or in an additional reaction which may be conducted at a later point in time. In this reaction the powder present in the mixer and having a temperature of about 80°–110° C. is moistured evenly with the di- or polyisocyanate of low viscosity and heated to 80° C., this being sprayed in under intensive turbulence. In an exothermic reaction almost completely quantitative polyaddition takes place within 20–40 minutes. At the same time the reaction temperature increases to about 120°–140° C. Surprisingly, not only is agglomeration avoided by means of the rapidly rotating mixing elements, but also with the aid of the multistage cutter head additional size-reduction is achieved. If, on the other hand, the reaction components are not vigorously intermixed, total lump formation rapidly occurs, since the polyisocyanate acts as binding agent under the reaction conditions.

The powdered, pressable material, cooled to at least 50° C., is placed into polyethylene bags and can be pressed whenever required.

TABLE 2

| Example 1 | TDI-residue 2 | Diol modification | | | Di- and polyisocyanate polyaddition | | |
|---|---|---|---|---|---|---|---|
| | | DG 3 | EGR 4 | PBA 5 | T 80 6 | D 44 7 | D 44 V |
| 6 | 86,7 III | 13,3 | — | — | 3,2 | — | 7,8 |
| 7 | 86,7 III | 13,3 | — | — | — | — | 21,0 |
| 8 | 88,0 IV | — | 12,0 | — | — | — | 8,2 |
| 9 | 88,0 IV | — | 12,0 | — | — | — | 11,8 |
| 10 | 83,0 I | 17,0 | — | 20 | — | 42,7 | — |

Data in parts by weight

Column 2: TDI-residue III = similar to TDI-residue I, but particle size: 80% < 1.4 mm
TDI-residue IV = similar to TDI-residue I, but particular size: 85% < 0.5 mm Columns 3 to 5: DG = diethylene glycol
EGR = ethylene glycol distillation residue (hydroxyl number: 517), consisting of mono- to hexa-ethylene glycol (sump product of the ethylene glycol production)
PBA: polyester containing hydroxyl end groups, produced from adipic acid and 1,4-butanediol (mol.-weight: 2250)

TABLE 2-continued

| | TDI-residue | Diol modification | | | Di- and polyisocyanate polyaddition | | |
|---|---|---|---|---|---|---|---|
| Example | | DG | EGR | PBA | T 80 | D 44 | D 44 V |
| 1 | 2 | 3 | 4 | 5 | 6 | 7 | |

Columns 6 to 8:  T 80 = toluylene diisocyanate (2,4: 2,6 - isomer mixture in a ratio of 80: 20)
D 44 = pure 4,4'-diphenylmethane diisocyanate
D 44 V = crude 4,4'-diphenylmethane diisocyanate with about 25% by weight of polynuclear components.

2. Processing into pressed sheets:
2.1 Pressing of the modified TDI-residue powders The powders obtained according to the patent examples 6-10 are pressed into 4.5 mm thick sheets at 220°-230° C. and 50-100 bars for 30 seconds per mm sheet thickness and removed from the press without cooling. The extremely hard pressed sheets, which are water-repellent, chemically resistant and wather resistant, have an application temperature of over 150° C. Upon flaming with an oxygen blast flame a marked increase in volume occurs on the surface at yellow to red heat, without the formation of droplets. If the blast flame is removed after 5-10 minutes the sheets are immediately self-extinguished.

pressed either immediately or within 3 months at 230° C./50 bars.

| | |
|---|---|
| Ball indentation hardness H 30: (DIN 53 456) | 325 MPa |
| Bending test: (ISO R 178) | E-modulus 4,725 MPa |
| | Flexural strength 145 MPa Deflection 2.45 % |
| Tensile test: (DIN 53 455) | E-modulus 4,810 MPa |
| | Tensile strength 86.5 MPa Elongation 1.85% |

2.2 Pressing with wood chips 0.5-1.5 cm-long chips of pinewood with a water content of 8.5-9.5% by weight are used, which are sprayed immediately before use with 1-8% by weight of crude diphenyl methane diisocyanate with an isocyanate content of 30% by weight. 10-16 mm-thick sheets of the following type are produced from the mixtures, described in Table 4, of the glued wood chips and the pressable powder according to the invention, at pressing temperatures of 170°-210° C. and a pressure of 30-70 bars and a pressing time of 10-30 seconds per mm sheet thickness:

(a) Statistical distribution of the mixing components (Example 20, 21)

TABLE 3

Physical properties of the pressed sheets

| | | | Bending test (ISO R 178) | | | tensile test(DIN53455) | | |
|---|---|---|---|---|---|---|---|---|
| Example | Pressable powder of example | Ball indentation hardness (DIN 53456) (MPa) | E-Modulus (MPa) | $\tau_B$ (MPa) | $\epsilon_B$ (%) | E-Modulus (MPa) | $S_R$ (MPa) | $D_R$ (%) |
| 11 | 6 | 245,3 | 3916 | 36,1 | 0,91 | 4100 | 29,9 | 0,76 |
| 12 | 7 | 290,4 | 4588 | 86,7 | 1,82 | 4900 | 55,1 | 1,20 |
| 13 | 8 | 263,5 | 3913 | 65,0 | 1,68 | 4600 | 59,1 | 1,30 |
| 14 | 9 | 290,0 | 4461 | 103,0 | 2,36 | 4500 | 56,4 | 1,27 |
| 15 | 10 | 180,7 | 2996 | 93,2 | 5,7 | 3400 | 58,1 | 5,75 |

$\tau_B$ flexural strength
$\epsilon_B$ elongation at break
$S_R$ tensile strength
$D_R$ elongation at break

EXAMPLE 16

In a special embodiment the powder produced according to Example 8 and modified with ethylene glycol sump residue and polyisocyanate D 44 V is additionally intensively mixed, at room temperature, with 3.6% by weight of D 44 V and 10 parts by weight of 5 mm-long glass fibres. A powdered composition is produced which is surprisingly stable in storage and which is (b) Sandwich structure with a covering layer consisting exclusively of modified TDI-residue powder and pure chipboard core (Example 17)
(c) Integral chipboard sheets, the content of the modified TDI-residue increasing from the interior towards the exterior (Examples 18,19)
In all cases the layers spread on to steel sheets in the required order are bonded into sheets with a volume weight of 750-900 kg/m³, under heat and in one single pressing step.

TABLE 4

| | Modified TDI residue Example (Parts by weight) | Wood (parts by weight) | Covering layer | | Intermediate layer | | Inner layer | |
|---|---|---|---|---|---|---|---|---|
| | | | Modified TDI-residue (% by wt) | Wood (% by wt.) | Modified TDI-residue (% by wt) | Wood (% by weight) | Mod. TDI-residue | Wood (% by weight) |
| Example | 1 | 2 | 3 | 4 | 5 | 6 | 7 | 8 |
| 17 | 40/8 | 60 | 100 | — | — | — | — | 100(8) |
| 18 | 22/8 | 78 | 75 | 25(4) | 17 | 83(5) | — | 100(6) |
| 19 | 40/9 | 60 | 75 | 25(6) | — | — | 17 | 83(6) |
| 20 | 70/9 | 30 | — | — | — | — | — | — |

TABLE 4-continued

| | Modified TDI residue Example (Parts by weight) | Wood (parts by weight) | Covering layer | | Intermediate layer | | Inner layer | |
|---|---|---|---|---|---|---|---|---|
| | | | Modified TDI-residue (% by wt) | Wood (% by wt.) | Modified TDI-residue (% by wt) | Wood (% by weight) | Mod. TDI-residue | Wood (% by weight) |
| Example | 1 | 2 | 3 | 4 | 5 | 6 | 7 | 8 |
| 21 | 30/9 | 70 | — | — | — | — | — | — |

Columns 1,2: Total amount of the TDi-residue or wood used
Columns 3, 5, 7: Content of the modified TDI-residue in the layer concerned
Columns 4, 6, 8: Content of pine wood chips: in brackets: content of % of glue (crude diphenylmethane diisocyanate), based on the weight of wood.

EXAMPLE 22

88 parts by weight of TDI-residue IV and 12 parts by weight of ethylene glycol distillation residue are brought to reaction in a mixer reactor at temperatures up to 120° C., analogously to Example 8 or 9, but at first without isocyanate components. Following cooling the powder obtained is intensively mixed with 250 parts by weight of pinewood chips, which had immediately beforehand been glued with 25 parts by weight of polyisocyanate D 44 V and the resulting mixture was pressed at 190° C./50 bars into a water-repellent chipboard sheet.

The novel chipboard pressed sheets produced according to the patent Examples 17–22 (Table 4) are distinguished by a considerable improvement in the following properties: reduced expansion caused by water, increased flexural strength and hardness, as well as easier mechanical processing (sawing, boring, polishing) without burr formation.

Particular advantageous is the fact that the chip board sheets after being flamed with an oxygen glast extinguish themselves within 30 seconds after removing the flame.

What is claimed is:

1. A process for the production of optionally cellular polyurethane plastics by the polyaddition of
   (A) polyisocyanates and, optionally,
   (B) low molecular weight and/or relatively high molecular weight compounds containing isocyanate-reactive hydrogen atoms, in the presence of
   (C) organic fillers and, optionally,
   (D) blowing agents, catalysts and other known additives, wherein the improvement comprises component (C) being a crosslinked distillation residue which is insoluble in inert organic solvents and which cannot be melted without decomposing, and which contains less than 15% free isocyanate groups, of the type accumulating as slag in the distillation of monomeric tolylene diisocyanates from the crude phosgenation products of tolylene diamines and which have been size-reduced to a mean particle size of less than 800 m$\mu$.

2. A process as claimed in claim 1, wherein the residue is first quenched and denatured by stirring into water.

3. A process as claimed in claim 1, wherein component (C) has a particle size of less than 350 m$\mu$.

4. A process as claimed in claim 1, wherein component (C) has a particle size of less than 10 m$\mu$.

5. A process as claimed in claim 1, wherein component (C) has first been chemically modified by reaction with compounds reactive to isocyanate groups.

6. A process as claimed in claim 5, wherein the compounds reactive to isocyanate groups used are carbonyl compounds and/or carbodiimide groups.

7. A process as claimed in claim 5, wherein unsaturated and/or ionic groups or groups capable of salt formation have been introduced into component (C) by a chemical modification reaction.

8. A process as claimed in claim 1, wherein component (C) is used in a quantity of from 2% to 50% by weight, based on the sum of components A, B and C.

9. A process as claimed in claim 1, wherein powdered azulmic acids are used as an additional organic filler.

* * * * *